Patented Dec. 28, 1937

2,103,411

UNITED STATES PATENT OFFICE 2,103,411

MILK PRODUCTS AND STABILIZER THEREFOR

Alexander Frieden, New Rochelle, and Sanford Joseph Werbin, Woodhaven, N. Y., assignors to Stein, Hall & Company, Inc., New York, N. Y., a corporation of New York No Drawing. Application September 30, 1936, Serial No. 103,354

14 Claims. (Cl. 99—25)

Our present invention relates generally to foods, and has particular reference to the stabilization of milk products such as ice cream, chocolate milk beverages, cheese, and the like.

In the manufacture of food products, in which milk or milk solids are essential ingredients, it is usually necessary, in commercial practice, to incorporate an added ingredient whose function it is to stabilize the emulsion or suspension, and to impart the proper body and other desirable features to the product. For this purpose, a variety of materials, themselves colloidal in nature, may be employed, such as gelatin, natural gums, starches, albumen, etc. In many instances, these stabilizing materials, used either singly or in combinations, are not entirely satisfactory. For example, where natural gums are utilized as stabilizers for ice cream, the ice cream mix is often apt to separate on holding, resulting in an undesirable, uneven distribution of fat and solids, and in a crumbly product.

Our present invention is predicated upon the discovery that certain non-colloidal salts have unusual and unexpected capabilities admirably adapting them for conjoint use with stabilizers of the customary colloidal variety, for the purpose of improving the stability and general qualities of milk products of the character mentioned. The salts which have this remarkable property are the soluble salts of earth alkali metals, notably the salts of calcium and magnesium.

In accordance with our invention, we are enabled to produce an improved milk product which is stabilized by the presence of a relatively small quantity of a mixture of a salt or salts of the character mentioned with a conventional stabilizer of the colloidal type.

While we are not prepared to advance any theory as to the reasons why a salt of the type mentioned improves the stabilizing qualities of the conventional colloidal stabilizers, it is our belief that the physico-chemical relationships of the interfaces existing between the colloidal casein particles, the albumen, the fat-water emulsion, and the molecular sugar solution are in some way changed so as to make the product more homogeneous and the union of its aggregates more intimate. For example, when the combination is applied to ice cream, the resulting mix has no tendency toward separation on holding; it has improved whipping properties; and the resultant product exhibits an unusually uniform and fine incorporation of air.

We have found that the desirable effects produced by the present improved stabilizing mixture are due, in some way, to the combined action of the ingredients. For example, taking viscosity as an indication, an ice cream mix prepared without any stabilizer at all and pasteurized at 150° F. has a viscosity of about 22 seconds, using a pipette type viscosimeter; the same mix with 0.25% calcium sulphate added to it manifests no increase in viscosity; when locust bean gum alone is added to the mix in an amount approximately .12% of the total, the viscosity rises to 43 seconds; but by the combined use of locust bean gum and calcium sulphate, in the same amounts, the viscosity is increased to 60 seconds.

As an example of one manner of carrying out our present invention, an improved ice cream mix may be prepared of the following ingredients, in substantially the proportions mentioned:

| | Percent |
|---|---|
| Skim milk powder | 8.00 |
| Sugar | 16.00 |
| Cream (40% fat) | 30.00 |
| Water | 45.78 |
| Locust bean gum | 0.15 |
| Calcium sulphate (pure precipitated) | 0.07 |

The foregoing mix is pasteurized at about 150–160° F., and otherwise treated in the usual way. The resultant mix is unusually stable, and, if properly prepared, will not separate on ageing. Furthermore, we have found that an ice cream mix, produced in the foregoing manner, has qualities which improve the "overrun" and which permit the freezing of fresh mixes with good overruns, and without any ageing.

As another example of an ice cream mix produced in accordance with the present invention, we may use the same ingredients as in the foregoing example, with the exception that the calcium sulphate is replaced by 0.10% of calcium lactate. In such an event, the amount of water would be correspondingly reduced to 45.75%.

The desirable qualities of the salts which we employ, of which calcium sulphate is merely an example, manifest themselves best when the salt is used with a natural gum, such as locust bean gum, gum tragacanth, gum karaya, etc. Of these, locust bean gum is the most desirable, since it possesses high jelling power, is easily handled, and is comparatively inexpensive.

As another example of the manner of utilizing the present invention, a chocolate milk beverage may be produced of the following ingredients, in substantially the proportions mentioned:

| | Percent |
|---|---|
| Powdered cocoa (low fat) | 1.80 |
| Sugar | 6.40 |
| Locust bean gum | .13 |
| Fluid milk | 91.52 |
| Calcium sulphate | .15 |

The foregoing product is completed by heating the mixture for thirty minutes at about 180° F.; then cooling and bottling it. The product is unusually stable, retaining the cocoa particles uniformly dispersed. No settling out of any character takes place until actual souring of the milk begins.

The unusual effect of the present stabilizing medium in connection with a beverage of the foregoing type is strikingly apparent when it is pointed out that no stable suspension may be prepared at all, by the use of locust bean gum alone. The combined use, however, of small amounts of the gum and of the salt results in the production of a thoroughly stable and palatable beverage.

In the foregoing example, the procedure may be varied by heating the mixture for about thirty minutes at about 200° F., in which event the amount of locust bean gum may be reduced to 0.10%, and the amount of calcium sulphate may be reduced to 0.10%. The amount of fluid milk would then be correspondingly increased to 91.60%.

The composition of the foregoing beverage might also be varied by employing calcium tartrate in place of the calcium sulphate. In such an event, the amount of calcium tartrate would be approximately .12%; the amount of locust bean gum would be approximately .12%; and the amount of fluid milk would be 91.56%; the mixture being heated for thirty minutes at approximately 200° F.

As an illustration of the manner in which the locust bean gum might be replaced by an equivalent type of colloidal stabilizer, a palatable chocolate milk beverage, of unusual stability, may be produced of the following ingredients:

| | Percent |
|---|---|
| Powdered cocoa (low fat) | 1.80 |
| Sugar | 6.40 |
| Tapioca flour | .50 |
| Fluid milk | 91.22 |
| Calcium sulphate | .08 |

These ingredients are heated for about thirty minutes to about 200° F., and the mixture is then cooled and bottled.

Where the beverage is to be made of a "high-fat" cocoa, the following mixture may be used, the same being heated to approximately 180° and then cooled:

| | Percent |
|---|---|
| Powdered cocoa (high fat) | 1.80 |
| Sugar | 6.40 |
| Locust bean gum | .10 |
| Fluid milk | 91.64 |
| Calcium sulphate | .06 |

Obviously, the salt may be used, if desired, in combination with any of the starches, natural gums, or other well known colloidal stabilizers customarily used in milk products. The proportion of salt to colloidal stabilizer may, however, vary to a certain extent, as indicated in the foregoing examples. Accordingly, our invention is not to be construed as being limited to the specific proportions hereinbefore illustratively given, although, as a practical matter, the amount of salt is relatively small with respect to the product as a whole; and, in the case of calcium sulphate or calcium lactate, a percentage between .05 and .25 is usually sufficient. Where calcium nitrate is used, lesser amounts will generally suffice; while with calcium tartrate, somewhat higher quantities may be found preferable. Where magnesium salts are used, somewhat higher amounts are usually to be used than with the corresponding calcium salts.

It will also be understood that the amounts of salt will vary with the temperature of the treatment to which any particular milk product may be subjected. Generally speaking, a treatment involving a higher temperature calls for the use of a somewhat smaller amount of salt; while the stabilization of a product which is heated to a lower temperature is best effected by using comparatively larger amounts of salt.

While the examples hereinbefore given relate in each case to the finished product, nevertheless it will be understood that, from certain aspects, our invention relates to the stabilizing medium or composition itself, because in commercial practice the stabilizing composition, consisting of a salt of an earth alkali metal, in combination with a conventional colloidal stabilizer, may be manufactured, sold, and dealt with separately. Such a stabilizing composition may also enter into the composition of preliminary mixtures, such as chocolate syrups, which are sold merely as a base for the subsequent preparation of chocolate beverages.

By the term "colloidal stabilizer", as used herein and in the appended claims, we intend to signify any of the well known stabilizers for milk products, such as the natural gums, the starches, the flours, gelatin, and the like, such stabilizers being themselves colloidal in character.

So far as the salts are concerned, we have ascertained that any soluble salt, either inorganic or organic, of an earth alkali metal, may be employed. By the term "soluble", we intend to refer to an appreciable solubility, as distinguished from insolubility of the character manifested by calcium carbonate.

It will be understood by those skilled in the art that certain salts of the category mentioned, although capable of functioning in the manner hereinbefore mentioned, may, for totally diverse reasons, be unsuitable for utility on a commercial scale. For example, calcium nitrate and calcium chloride are generally too hygroscopic for convenient commercial handling. The barium salts would not be employed for foods because of their poisonous character. The strontium salts are, in general, not commercially feasible to use because they are too expensive. All of these salts are, however, inherently capable of serving as the equivalents of calcium sulphate, for example, in producing the stabilizing and emulsifying effects toward which our invention is directed.

In general, it will be understood that changes in the details herein described for the purpose of explaining the nature of our invention, may be made by those skilled in the art without departing from the spirit and scope of the invention as expressed in the appended claims. It is, therefore, intended that these details be interpreted as illustrative, and not in a limiting sense.

Having thus described our invention, what we claim as new and desire to secure by Letters Patent is:

1. A milk product stabilized by the presence of a relatively small quantity of a mixture of colloidal stabilizer and a salt of an earth alkali metal.
2. A milk product stabilized by the presence of a relatively small quantity of a mixture of colloidal stabilizer and a calcium salt.
3. A milk product stabilized by the presence of a relatively small quantity of a mixture of colloidal stabilizer and a magnesium salt.
4. A milk product stabilized by the presence of a relatively small quantity of a mixture of natural gum and a salt of an earth alkali metal.
5. A milk product stabilized by the presence of a relatively small quantity of a mixture of natural gum and a calcium salt.
6. A milk product stabilized by the presence of a relatively small quantity of a mixture of natural gum and a magnesium salt.
7. A milk product stabilized by the presence of a relatively small quantity of locust bean gum and a salt of an earth alkali metal.
8. A milk product stabilized by the presence of a relatively small quantity of locust bean gum and a calcium salt.
9. A milk product stabilized by the presence of a relatively small quantity of locust bean gum and a magnesium salt.
10. An ice cream mix stabilized by the presence of a relatively small quantity of a mixture of colloidal stabilizer and a salt of an earth alkali metal.
11. A chocolate milk beverage stabilized by the presence of a relatively small quantity of a mixture of colloidal stabilizer and a salt of an earth alkali metal.
12. A stabilizing composition for a milk product, comprising a colloidal stabilizer and a salt of an earth alkali metal.
13. A stabilizing composition for a milk product, comprising a natural gum and a salt of an earth alkali metal.
14. A stabilizing composition for a milk product, comprising locust bean gum and a salt of an earth alkali metal.

ALEXANDER FRIEDEN.
SANFORD JOSEPH WERBIN.